Patented Aug. 5, 1952

2,606,164

UNITED STATES PATENT OFFICE 2,606,164

MAKING HOMOGENEOUS DISPERSIONS OF POLYMERS IN DRYING OILS

Walter A. Henson and Franklin G. Edwards, Midland, Mich., assignors to The Dow Chemical Company, Midland, Mich., a corporation of Delaware No Drawing. Application November 25, 1949, Serial No. 129,493

7 Claims. (Cl. 260—23)

This invention relates to a method of making homogeneous dispersions of water-insoluble polymers in drying oils. It relates in particular to a method whereby such dispersions may be produced employing any drying oils, even those which are normally considered inferior for coating compositions, and using polymers which are normally considered to be insoluble in such oils.

Some of the vinyl type of polymeric substances have been disclosed to be capable of forming homogeneous mixtures with drying oils when there is present a substantial portion of an active solvent of the polymer, which solvent is miscible with the oil. It is known that when the solvent is evaporated from such a composition, the deposited film has relatively poor wear-resistance and requires either a prolonged drying period of the order of several days at ordinary temperatures, or a lengthy treatment which may last 24 hours or more at elevated temperatures before the oil in the film is fully oxidized and the composition is tack-free. Such compositions accordingly have had little practical utility.

There are many polymeric substances commonly produced in aqueous emulsions whose latex-like dispersions are capable of depositing continuous film. Most such polymers contain vinyl compounds in the polymeric molecule, and while many of them have rubber-like properties, others are typical thermoplastics. Other emulsion-produced polymers do not deposit continuous coatings from their latices, yet they have properties which would be desirable in coatings. It would be desirable to find a method whereby all such emulsion-produced polymeric materials might be incorporated in drying oils to provide a new type of homogeneous dispersion in which the advantageous properties of the polymeric bodies and of the oils can be combined in the production of improved coatings. Among the types of polymers which it is desired to so incorporate into drying oil compositions are those of the following typical systems: styrene-butadiene; vinylidene chloride-acrylonitrile; vinyl chloride-vinylidene chloride; vinyl chloride-vinylidene chloride-ethyl acrylate; butadiene-acrylonitrile; 2-chlorobutadiene polymers and the like. Each of these is prepared conventionally by polymerization of the corresponding monomers in aqueous emulsions to produce a material which is commonly called a latex. The oils, which it would be desirable to employ in making the dispersions above referred to, include those oils having inferior drying properties, such as soyabean oil, although it is desirable as well that the method should be applicable to the production of uniform dispersions of the polymer in the better classes of the drying oils including, but not limited to, linseed oil, tung oil, perilla oil and oiticica oil, as well as the styrene-modified drying oils of U. S. Patents 2,468,747 and 2,468,798. The attainment of the stated desirable results constitutes the object of the present invention.

It has now been found that homogeneous compositions of any of the suggested types of the polymeric substances dispersed in drying oils may be produced by a simple and novel procedure. The new method comprises first, dispersing an oil-soluble emulsifying agent in the oil to be employed, and then stirring into the resulting solution the aqueous latex-like dispersion of the polymeric body with which it is intended to fortify the oil. The resulting mixture is a water-in-oil emulsion, or, more properly, it should be defined as an emulsion of the polymer latex in the oil. In this composition the polymer particles remain dispersed in the water while the latter is broken up into fine droplets and is in turn dispersed in the oil which is the continuous phase. The method of the present invention may comprise the further step of treating the latex-in-oil emulsion to remove the water therefrom, leaving the very fine polymer particles dispersed in the oil. If the deposited coatings are to be dried at room temperature or at any temperature substantially below 80° C., it is not essential that the water component of the latex-in-oil emulsion be removed before depositing the coating. If drying is to take place at a temperature at or about 80° C., the water should be removed to avoid the formation of dimples or "craters" in the dried film. It has been found that the removal of water from this intermediate composition may be effected by either of two methods. Methanol or other volatile, and at least partially water-miscible organic coagulant for the latex solids, which is not a solvent for said solids, may be added to the latex-in-oil emulsion to effect coagulation of the latex particles from the water droplets in which they are dispersed. Examples of coagulants which may be used include methanol, ethanol, propanol and isopropanol. Other volatile coagulants are known to those skilled in the art. The water may thereafter be removed simply by passing the resulting mixture through a paint mill, suitably during the introduction of pigments into the composition. The polymer-in-oil dispersion will pass through the mill while the water layer will be squeezed from the composition and will flow off from the surface of the material being treated. A second method of removing water from the latex-in-oil emulsion, and which offers advantages in those cases in which the oil is to be cooked with other coating constituents, comprises placing the latex-in-oil emulsion in a varnish kettle, and subjecting it to a blowing operation at gradually increasing temperatures (according to known bodying schedules) until the water has been vaporized therefrom. This accomplishes both the desired dehydration of the polymer-in-oil dispersion and a further bodying of the oil portion of the system. It offers the advantage that the bodying may be carried out following well-recognized principles just prior to the incorporation of modifying constituents common in the paint and varnish industries.

Most of the polymeric substances useful in the present invention, when prepared in latex form, consist of about 40 to 60 parts by weight of the dispersed polymer solids in from 60 to 40 parts of water, together with appropriate small amounts of water-soluble emulsifying or dispersing agents. While any such concentration can be used in the method of the present invention, it has been found that the solids content of the latex exerts a peculiar and non-linear effect upon the viscosity of the polymer-bodied oil. Examination of many polymer-in-oil dispersions, produced in accordance with the present invention, has shown that a latex of 60 per cent solids content or one having 35 to 45 per cent solids content will yield a latex-in-oil dispersion having a higher viscosity than will a latex of the same polymer in which the solids content is about 50 per cent. For the purpose of the present invention, an amount of such a latex is taken which will provide about 10 to 50 parts of polymer solids (preferably 17 to 35 parts) for incorporation in each 100 parts of the drying oil, by weight.

One polymeric body which gives very desirable properties when dispersed in drying oil, in accordance with the present invention, is a latex-like dispersion of a copolymer of from 50 to 90 per cent vinyl chloride and correspondingly from 50 to 10 per cent of vinylidene chloride. In view of the limited solubility of such polymers in most solvents, surprisingly good properties are obtained when the mixture of monomers, which is copolymerized in aqueous emulsion to produce the latex for use herein, consists of 75 parts of vinyl chloride and 25 parts by weight of vinylidene chloride. This group of vinylchloride-vinylidene chloride copolymers, when produced in aqueous emulsion, is characterized by a particle size in the general range from 0.2 to 2 microns, and when such a latex is dispersed in a drying oil to form a latex-in-oil dispersion, and when such dispersion is dehydrated by one of the methods mentioned above, there is obtained a reinforced oil whose dried films have greatly improved tensile strength and provide abrasion-resistance and other physical protection to the surfaces on which they are deposited. The preparation and characteristics of the materials, which may be produced by the present method, may be illustrated in the following examples:

EXAMPLE 1

2 grams of glyceryl ricinoleate, to serve as an oil-soluble emulsifier, was dissolved in 50 grams of an oxidized soyabean oil. 75 grams of titanium dioxide pigment was worked into the oil on a 3-roll paint mill, and when the composition had become homogeneous, there was added thereto 25 grams of a copolymer in an aqueous latex-like dispersion consisting of 58.8 per cent solids and 41.2 per cent water. The solid phase of the latex was the copolymer of 75 per cent vinyl chloride and 25 per cent vinylidene chloride. The mixture was worked on the mill for a few minutes whereupon it gave every evidence of being uniform. Close examination showed it to be a latex-in-oil dispersion.

EXAMPLE 2

In a similar manner, there was prepared a mixture of 56 grams of oiticica oil and 85 grams of blown soyabean oil. To this mixture was added 100 grams of titanium dioxide, 5.6 grams of an oil-soluble emulsifier, consisting essentially of a monoaryl ether of ethylene glycol, and 5 grams of tetrasodium pyrophosphate. This mixture was homogenized on a paint mill and there was then added 141 grams of a latex having 42 per cent solids (60 grams) and 58 per cent water. The dispersed solids consisted of the same copolymer as that employed in Example 1. After mixing on the paint mill, there was obtained a homogeneous latex-in-oil emulsion similar in appearance to that of Example 1.

EXAMPLE 3

2 grams of glyceryl ricinoleate, 50 grams of perilla oil and 55 grams of a latex (the solid portion of which consisted of 25 grams of the same copolymer as that identified in the previous examples) were mixed on a 3-roll mill until homogeneous, after which, there was added to the mixture on the mill, 100 grams of methanol and 100 grams of titanium dioxide. As milling was continued, the pigment became intimately dispersed in the mixture and water separated from the emulsion and ran off from the mill. After a few minutes, there was obtained a substantially anhydrous and very uniform coating composition.

EXAMPLE 4

A stock solution of 4 parts of glyceryl monoricinoleate in each 100 parts of a heat-bodied linseed oil was prepared and portions of the solution were treated with various amounts of a latex of the copolymer of 75 per cent vinyl chloride and 25 per cent vinylidene chloride. The copolymer was coagulated and water removed by the addition of methanol to the mixture on the mill, as in Example 3. Pigments and driers were added on the mill, to produce a standard formulation for an exterior house paint. Each of the resulting substantially anhydrous paints was employed to coat a small sheet of tinplate and the coated metal was dried for 40 hours at 200° F. The films were stripped from the smooth metal surface and their respective tensile strengths were measured. The results are reported in the following table in pounds per square inch of the original cross-section of the various films:

Table 1

| Parts Copolymer per 100 Parts Oil | Tensile Strength |
|---|---|
| 5 | 1,475 |
| 10 | 2,070 |
| 15 | 2,479 |
| 20 | 2,880 |
| 30 | 2,700 |
| 50 | 2,464 |

The results of these and other tests indicate that the optimum tensile strength is obtained when the ratio of the copolymer is from 17 to 35 parts by weight for each 100 parts of the drying oil in the paint, and that a significant increase in tensile strength is obtained whenever the amount of the copolymer is from 10 to 50 parts for each 100 parts of oil.

EXAMPLE 5

To illustrate further the improvement in strength of drying oil films, which results from the introduction of the film-forming polymer latex in the manner previously described, several compositions were prepared consisting essentially of the drying oil and oil-soluble emulsifier and varying amounts, as shown in the table below, of the copolymer of 75 per cent vinyl chloride and 25 per cent vinylidene chloride. No pigments or other modifiers were introduced into this composition. Coatings, having a wet thickness of 0.006 inch, were applied to dairy tin. The so-deposited films were dried at one of the temperatures given in Table 2 and for one of the periods of time reported in that table. After this curing treatment, the samples were stripped from the smooth metal surface and the tensile strength of the cured film was determined. The ratio of polymer to linseed oil in the composition was varied from 10 per cent to 50 per cent. The results appear in Table 2.

Table 2
TENSILE STRENGTH OF POLYMER-IN-OIL FILMS, DRIED AT TEMPERATURES SHOWN

| Composition | | Room Temperature | | | 140° F. | | | 200° F. | | |
|---|---|---|---|---|---|---|---|---|---|---|
| Parts Polymer | Parts Oil | 240 hrs. | 288 hrs. | 432 hrs. | 24 hrs. | 48 hrs. | 168 hrs. | 5 hrs. | 24 hrs. | 48 hrs. |
| 0 | 10 | --- | --- | --- | 167 | 225 | 195 | --- | --- | --- |
| 1 | 9 | 300 | 200 | 275 | 160 | 238 | 425 | 100 | 217 | 300 |
| 3 | 7 | 563 | 364 | 325 | 275 | 472 | 650 | 174 | 431 | 643 |
| 1 | 1 | 650 | 625 | 704 | 611 | 750 | 850 | 562 | 1,056 | 1,071 |

The compositions, which may be prepared in accordance with the method of the present invention, are especially useful in the formulation of top coatings for oilcloth or linoleum as well as in the preparation of paints suitable for various uses. The paints may contain no other film-forming materials than the herein described polymer and oil system, or they may contain other resinous film-forming constituents such as alkyd resins now being used in a variety of paint formulations. To illustrate the advantage of employing a dispersion of a vinyl chloride-vinylidene chloride copolymer in drying oil as a part of the film-former in an alkyd resin paint, a comparison was made between the tensile strengths of the paint films deposited from two commercial alkyd paints and the films deposited from mixtures of the same paints with the polymer-in-oil dispersion in a ratio intended to provide 30 parts of polymer-modified drying oil for each 100 parts of alkyd resin present in the paint. The films were dried on tinplate, as above. The results appear in the following Table 3:

Table 3

| Composition | Tensile Strength |
|---|---|
| alkyd paint (1) | 1,688 |
| alkyd paint (1) + polymer-in-oil | 2,103 |
| alkyd paint (2) | 2,150 |
| alkyd paint (2) + polymer-in-oil | 2,575 |

One method of water removal has been illustrated in some of the preceding examples. Another method, which involves blowing of the latex-in-oil emulsion, is illustrated in the following Example 6.

EXAMPLE 6

70 parts of soyabean oil having a viscosity rating of "A" on the Gardner scale, was stirred together with 3 parts of glyceryl ricinoleate until the latter had dissolved. There was then added, with agitation, 70 parts by weight of an aqueous latex-like dispersion of the same copolymer as that employed in the prior examples, said latex containing 30 parts by weight (42%) of dispersed polymer particles. When the uniform latex-in-oil emulsion had been obtained, the mixture was heated in a varnish kettle while air was blown therethrough. Blowing was continued for 4 hours at 45–650° C., then for 3 hours at 50–100° C., and finally for 11 hours at 100–110° C. (Other bodying temperatures, normally employed while blowing oil, may be used.) At the end of this treatment, the composition was substantially anhydrous and gave every evidence of being a uniform and permanent homogeneous dispersion of the polymer-in-oil. The oil viscosity had increased to a value of "G" on the Gardner scale. The advantage of this mode of operation lies in its ease of application to standard varnish and paint formulation procedures, as the bodying operation can take place during dehydration of the latex-in-oil emulsion.

The examples herein have dealt with the use of the latex produced by the emulsion polymerization of a mixture of vinyl chloride and vinylidene chloride. Similar results have been obtained with numerous other latex-like dispersions all of which can be dispersed as latex-in-oil emulsions and can be dehydrated by one of the disclosed methods. Examples of polymeric bodies, whose normal latex-like dispersions may be employed in the method of the invention, include: styrene-butadiene; vinylidene chloride-acrylonitrile; vinyl chloride-vinylidene chloride; vinyl chloride-vinylidene chloride-ethyl acrylate; butadiene-acrylonitrile; 2-chlorobutadiene polymers, and the like. The coating qualities of any drying oil may be improved by introducing a polymer latex thereto, using the present method.

We claim:

1. The method which comprises dissolving an oil-soluble emulsifying agent in a drying oil, stirring into the resulting solution an aqueous polymer dispersion, prepared by the emulsion polymerization of the corresponding unsaturated monomeric material, in an amount to contain from 10 to 50 per cent as much dispersed polymer as the weight of the oil, continuing the mixing operation until a uniform emulsion of the aqueous dispersion of polymer is obtained with the oil as the continuous phase, and dehydrating the polymer dispersion-in-oil composition before it is applied as a surface coating.

2. The method which comprises dissolving an oil-soluble emulsifying agent in a drying oil, stirring into the resulting solution an aqueous polymer dispersion, prepared by the emulsion polymerization of the corresponding unsaturated monomeric material, in an amount to contain from 10 to 50 per cent as much dispersed polymer as the weight of the oil, continuing the mixing operation until a uniform emulsion of the aqueous dispersion of polymer is obtained with the oil as the continuous phase, and adding to said emulsion a volatile organic coagulant for the polymer solids, which is at least partially water-miscible and is not a solvent for the polymer solids, to coagulate the solids from the aqueous dispersion of polymer, and to separate the water from the oil.

3. The method which comprises dissolving an oil-soluble emulsifying agent in a drying oil, stirring into the resulting solution an aqueous polymer dispersion, prepared by the emulsion polymerization of the corresponding unsaturated monomeric material, in an amount to contain from 10 to 50 per cent as much dispersed polymer as the weight of the oil, continuing the mixing operation until a uniform emulsion of the aqueous dispersion of polymer is obtained with the oil as the continuous phase, and blowing air through the emulsion at bodying temperatures until the mixture is substantially dehydrated.

4. The method as claimed in claim 1, wherein the dispersed polymer solids are a copolymer of from 50 to 90 per cent vinyl chloride and correspondingly from 50 to 10 per cent vinylidene chloride.

5. The method as claimed in claim 1, wherein the dispersed polymer solids are a copolymer of 75 per cent vinyl chloride and 25 per cent vinylidene chloride.

6. The method as claimed in claim 2, wherein the dispersed polymer solids are a copolymer of 75 per cent vinyl chloride and 25 per cent vinylidene chloride, and the volatile coagulant is methanol.

7. The method as claimed in claim 3, wherein the dispersed polymer solids are a copolymer of 75 per cent vinyl chloride and 25 per cent vinylidene chloride.

WALTER A. HENSON.
FRANKLIN G. EDWARDS.

REFERENCES CITED

The following references are of record in the file of this patent:

UNITED STATES PATENTS

| Number | Name | Date |
|---|---|---|
| 2,348,154 | Scott et al. | May 2, 1944 |
| 2,450,534 | Voet | Oct. 5, 1948 |
| 2,456,671 | Beynon | Dec. 21, 1948 |
| 2,511,171 | Mitchell | June 13, 1950 |